May 19, 1970  W. B. ROBINSON  3,512,240
CORE ASSEMBLY TOOL
Filed June 16, 1967  3 Sheets-Sheet 2
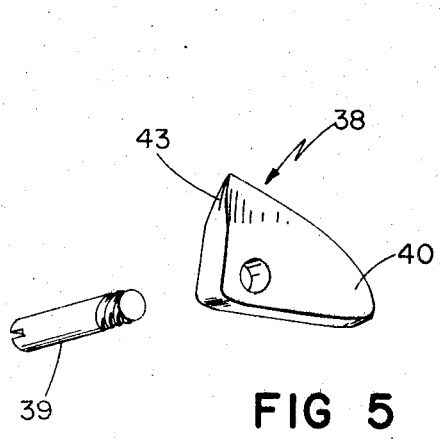
FIG 5
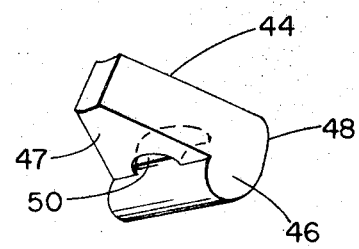
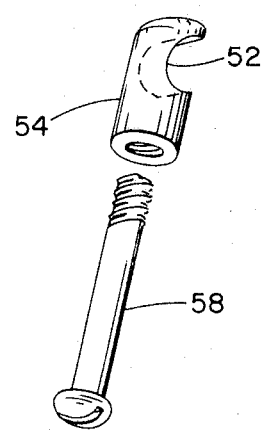
FIG 6
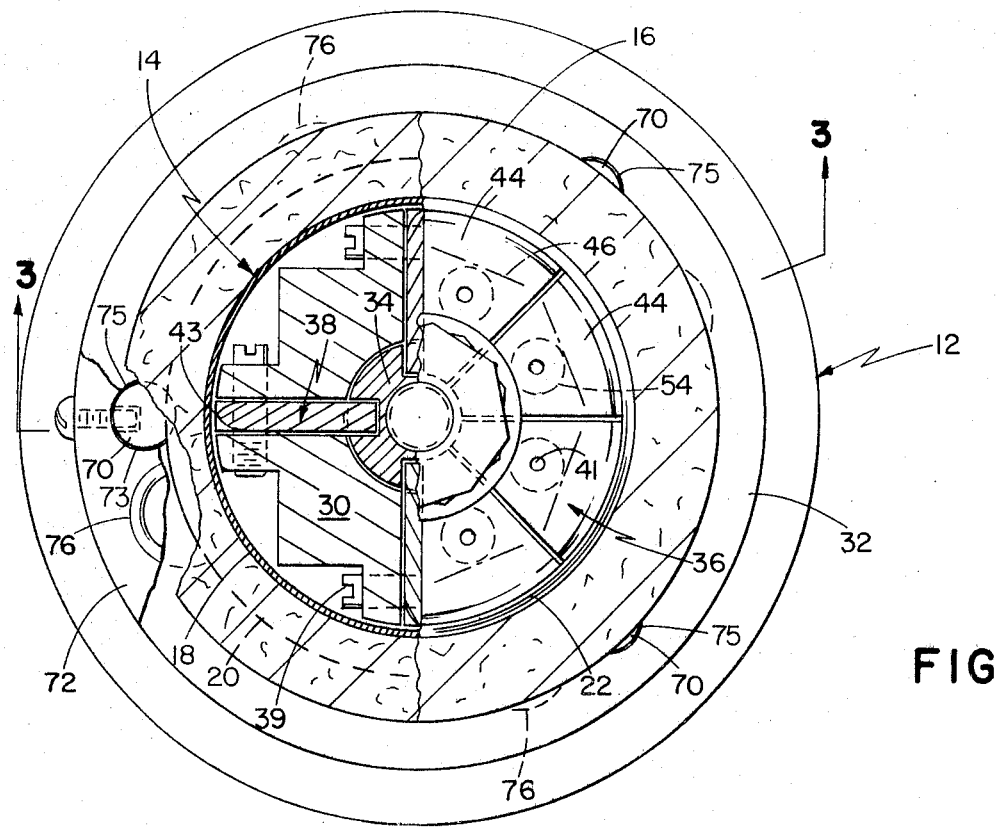
FIG 2

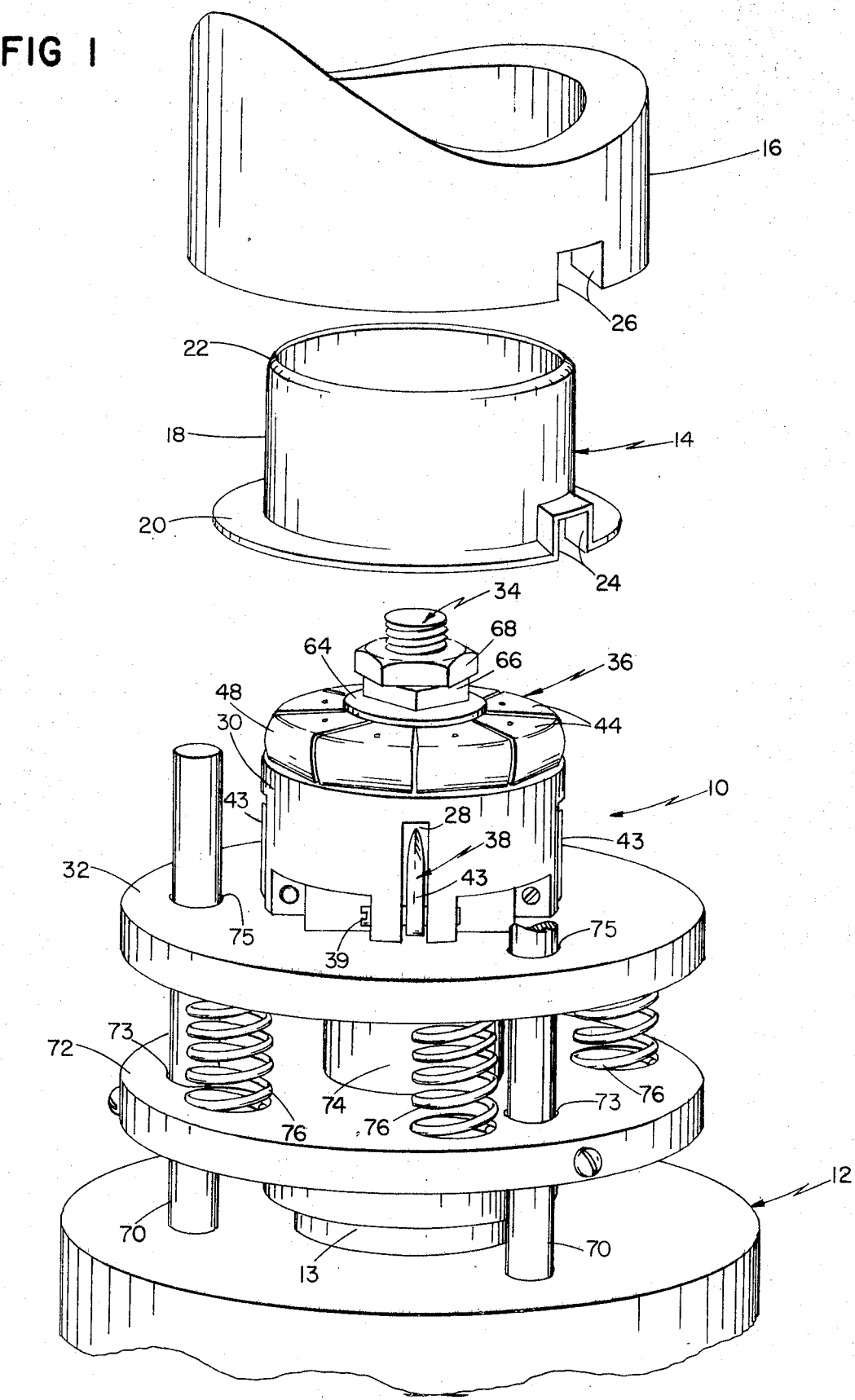

May 19, 1970     W. B. ROBINSON     3,512,240
CORE ASSEMBLY TOOL
Filed June 16, 1967     3 Sheets-Sheet 3
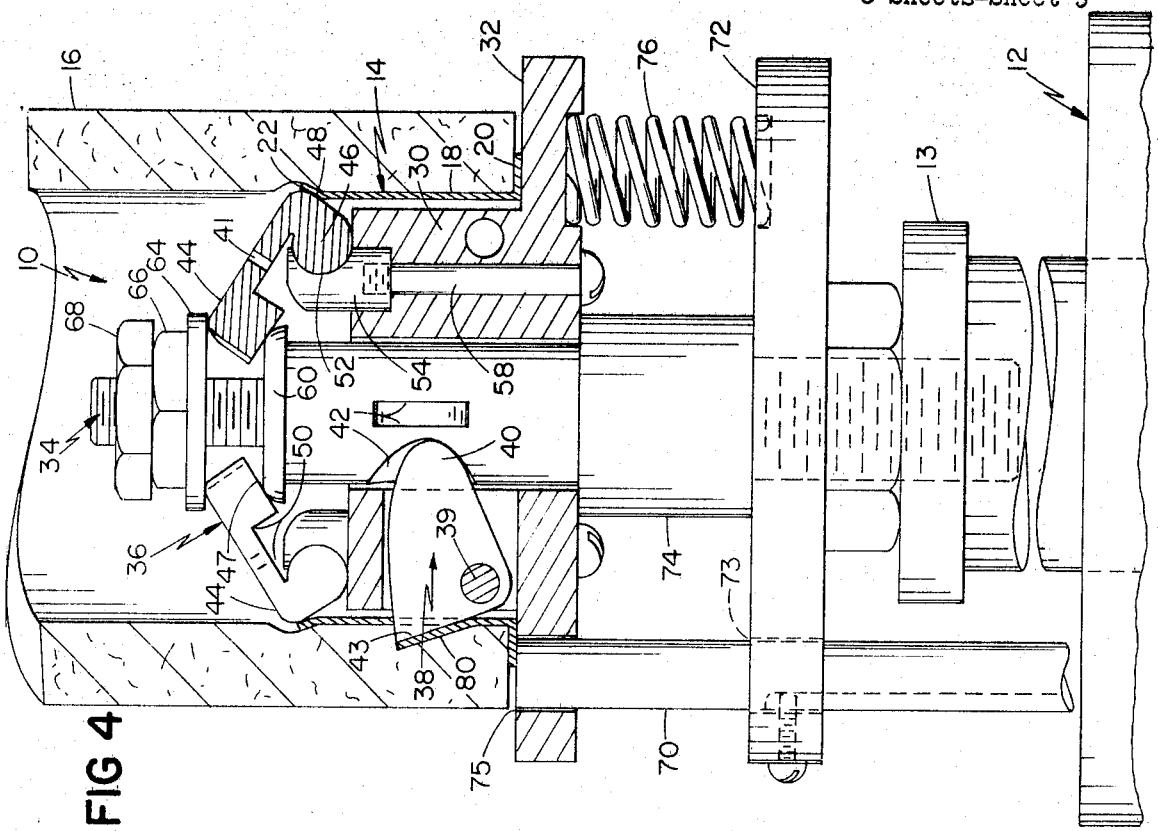
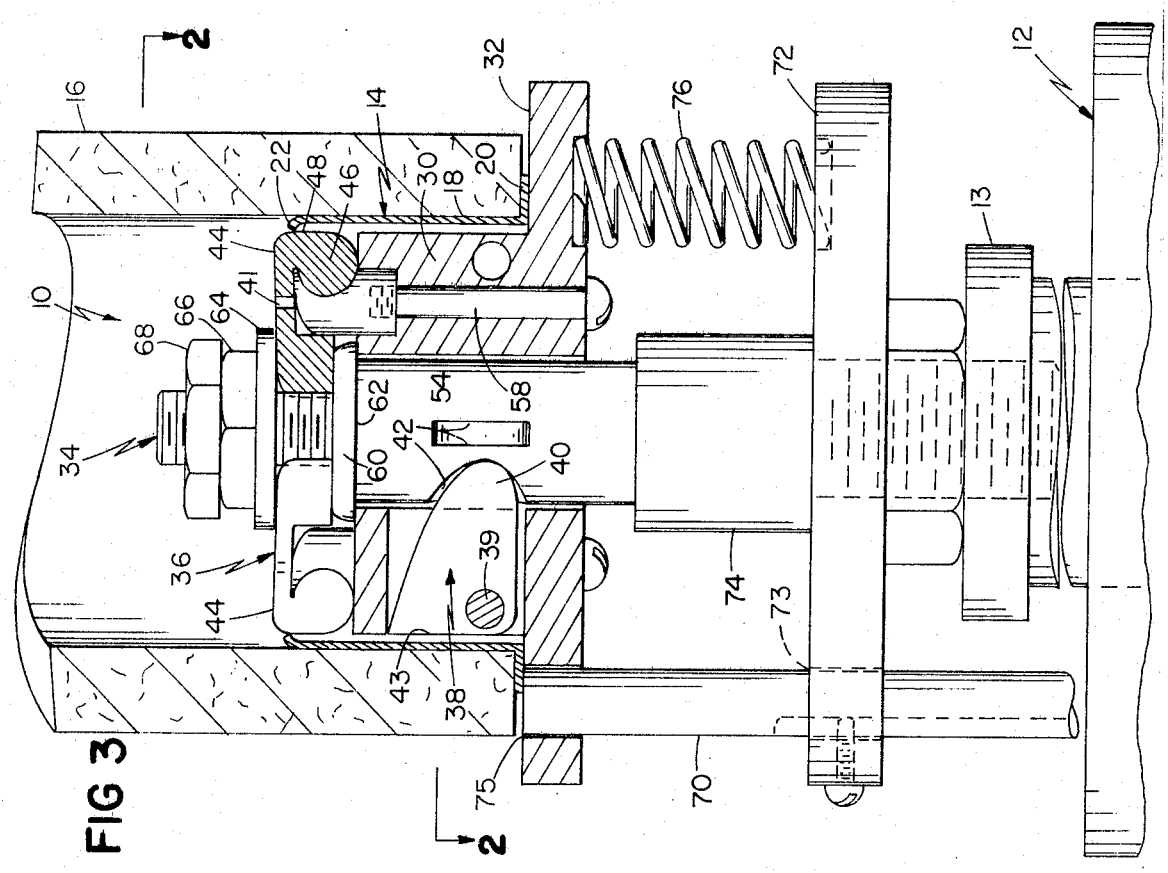

United States Patent Office 3,512,240
Patented May 19, 1970

3,512,240
CORE ASSEMBLY TOOL
Walter Bartlett Robinson, Natick, Mass., assignor to New England Pressed Steel Company, Natick, Mass., a corporation of Massachusetts
Filed June 16, 1967, Ser. No. 646,599
Int. Cl. B23p 19/00; B21d 39/00
U.S. Cl. 29—200                                    7 Claims

ABSTRACT OF THE DISCLOSURE

An assembly tool for mounting tubular core tips within tubular cores, the tool including flange expansion means for forcing a radially-inwardly extending entrance flange at one axial end of the core tip outwardly so that the diameter of the flange is not less than the inside diameter of the cylindrical wall of the core tip, and cutters for shearing portions of the cylindrical wall of the core tip and forcing the sheared portions outwardly into the cylindrical wall of the core.

---

This invention relates to core tips for tubular cores and, more particularly, to tools for placing core tips within the ends of cores and securing them in place.

It is a primary object of the present invention to provide a new and improved core assembly tool for forcing a tubular core tip into the end of a tubular core until a reinforcing flange at one end of the tip engages the end of the core and then expanding the leading, inwardly tapered end of the core tip into the core to provide for unobstructed passage of a mandrel through the core and shearing portions of the tubular wall of the core tip outwardly into the core to prevent rotation of the core tip relative thereto.

The invention accomplishes these and other objects by providing an assembly tool comprising a housing; an operating member; flange expansion means defining a radially-outward facing surface adapted for engaging the entrance flange of a core tip, the flange expansion means being responsive to the operating member for movement between first and second positions, the diameter of the surface being increased during the movement from the first to the second position for expanding the entrance flange; and cutters responsive to the operating member for shearing portions of the cylindrical wall of the core tip and forcing the portions outwardly into the cylindrical wall of the core in response to movement of the operating member between the first and second positions.

Other objects, features and advantages will appear from the following detailed description of a preferred embodiment of the invention, taken together with the attached drawings in which:

FIG. 1 is a perspective view of a core asembly tool constructed in accordance with the present invention, together with a core and core tip useful therewith;

FIGS. 2–4 are plan sectional views of the tool of FIG. 1; and

FIGS. 5–6 are perspective views of components of the tool of FIG. 1.

Referring more particularly to the drawings, there is shown in FIG. 1 a core tip assembly tool 10 mounted on an air cylinder 12 for forcing a generally tubular metal core tip 14 into the end of a tubular paper core 16 and securing it in place within the core. Core tip 14 includes a generally cylindrical wall 18 having an outside diameter substantially equal to the inside diameter of core 16 to provide a tight fit between the two, a radially-outwardly extending, circumferential reinforcing flange 20 at one axial end of wall 18, and an inwardly inclined flange or core entrance portion 22 at the other axial end of wall 18. Flange 20 extends perpendicular to the axis of the core tip for engaging the axial end of core 16; flange 22 (as shown in axial cross-section in FIGS. 3–4) provides an entrance radius for guiding core tip 14 into core 16 and preventing galling of the interior surface of core 16 during tip insertion. A keyway 24 with axially-extending sides is provided in flange 20 for engaging a corresponding driving notch or keyway 26 in the end portion of tube 16.

As shown more clearly in FIGS. 2–4, assembly tool 10 comprises a substantially cylindrical housing 30 with a radially-extending base plate 32 at the bottom thereof, an operating shaft 34 extending axially through housing 30, and a segmented expansion head 36 mounted on top of housing 30. The diameter of housing 30 is slightly less than the inside diameter of wall 18 of core tip 14; base plate 32 has a diameter greater than that of core 16 or flange 20 of core tip 14; and the diameter of the portion of head 36 having the greatest diameter when the head is in its unexpanded position shown in FIG. 1 is approximately equal to that of housing 30 and, preferably, slightly greater than the minimum diameter of entrance flange 22 of core tip 14. The combined axial height of housing 30 and head 36 is slightly less than that of core tip 14 so that (FIG. 3) when the core tip is seated over the assembly tool with flange 20 of core tip 14 engaging base plate 32, entrance flange 22 of core tip 14 will engage the inwardly rounded upper portion of the outer periphery of head 36.

Four Woodruff-type cutters 38 (FIG. 5) are mounted by bolts 39 in recesses 28 spaced at approximately 90° intervals within housing 30 for pivotal movement in planes parallel to the axis of tool 10 between first positions (FIGS. 1 and 3) in which the radially outward facing cutting surface 43 of each cutter is substantially flush with the outer periphery of housing 30 and second positions (FIG. 4) in which the cutting surface is outside and inclined relative to the housing periphery. The radially inward end 40 of each cutter 34 extends into and engages a keyway 42 in shaft 34.

Head 36 includes eight circumferentially spaced head segments 44 (FIG. 6) pivotally mounted on the upper end of housing 30. As shown, each head segment 44 comprises a substantially 45° sector of a circular plate with an arcuate rod 46 welded on the bottom 47 of the segment adjacent the radially-outward facing surface 48 thereof. A drilled recess 50 is provided in the bottom of each segment 44 for engaging, in conjunction with the radially inward-facing periphery of rod 46, a half-round milled slot 52 in a stud 54. Each stud 54 is mounted in a drilled recess 56 extending axially into housing 30 and is secured therein by a bolt 58. An oil hole 41 extends from the top of each segment 44 to the recess 50 therein.

A hardened thrust washer 60 is mounted on a shoulder 62 of shaft 34 adjacent the top of housing 30 in engagement with the bottom surfaces 47 of segments 44. A second washer 64 and a pair of nuts 66, 68 are mounted on shaft 34 above and loosely engaging the top of segments 44.

As shown in FIGS. 1, 3 and 4, operating shaft 34 is axially aligned with and secured to the piston 13 of cylinder 12. A drive plate 72 is mounted on the end of piston 13. Three knockout pins 70 extend from a wear plate mounted on the end of cylinder 12, through holes 73 in drive plate 72 and holes 75 in base plate 32, to directly below the end wall of core 16. The sliding movement of pins 70 through drive plate 72 is limited by a key and slot. A tubular sleeve 74 surrounding a portion of drive shaft 34, and four coil springs 76 mounted in circumferentially spaced recesses, are provided intermediate base plate 32 and drive plate 72.

In operation, core tip 14 is placed on assembly tool 10 with flange 20 adjacent base plate 32 and flange 22 adjacent head 36. Core 16 is moved to a position adjacent and axially aligned with the coaxial tip and tool. A valve (not shown) is actuated, supplying air under pressure to cylinder 12 and moving piston 13, and the assembly tool 10 mounted thereon, upward, forcing tip 14 into core 16 and reinforcing flange 22 into engagement with the axially-forcing end of the core. Springs 76 exert a force greater than that required to insert the tip and insure that drive shaft 34 does not move within and relative to housing 30 until the core tip (FIG. 3) is fully inserted into core 16, with flange 20 of the tip engaging the end of the core.

After the core tip has been fully inserted, continued movement of piston 13 overcomes the force of springs 76 and moves drive shaft 32 upwardly within and relative to housing 30 thereby pivoting cutters 38 and head segments 44 into the position shown in FIG. 4. The distance shaft 32 is permitted to move within the housing is limited by sleeve 74, the opposite ends of which, as shown in FIG. 4, engage drive plate 72 and base plate 32 when the desired limit of pivotal movement of the cutters and head segments has been reached. Further piston movement would drive the entire tool upward, crushing core 16. Cylinder 12 is therefore designed to produce less force than would be required for any such crushing and piston movement automatically stops when the upper end of sleeve 72 comes into contact with the bottom of base plate 32.

As shown, the upward movement of shaft 34 within housing 30 moves the inner ends 40 of cutters 38 upwardly, pivoting cutters 38 about bolts 39. The cutting surface 43 of each cutter is forced radially outwardly through the adjacent portion of wall 18 of core tip 14, thereby shearing a total of four V-shaped spurs 80 from wall 18 and forcing the spurs outwardly into core 16.

Shaft 34 also moves thrust washer 60 upwardly, pivoting segments 44 of head 36 about the axes of the slots 52 of the studs 54 securing the segments to housing 30 and moving the portions of outer surface 48 of the segments above the slot axes radially outwardly until the diameter of radially outermost portions of surfaces 48 is at least as great as the inside diameter of core 16. As surfaces 48 engage entrance flange 22 of core tip 14, the pivotal movement of head segments 44 expands flange 22 until its inner diameter is equal to or greater than the inside diameter of wall 18 of core tip 14. Preferably, the maximum diameter portions of segment 44 engage the upper axial end portion of flange 22 so that the flange is inverted, forming (FIG. 4) an outwardly flared flange, extending into core 16.

After spurs 80 have been driven into core 16 and flange 22 expanded, the air flow into cylinder 12 is reversed, moving piston 12 downwardly, thereby retracting cutters 38 and head segments 44 and drawing tool 10 axially out of core tip 14, which remains fixed in position within core 16. The upper ends of knockout pins 70 engage the lower end of core 16 and tip 14 and assist in disengaging the tool from the core.

Other embodiments of the invention within the scope of the following claims will occur to those skilled in the art.

What is claimed is:

1. An assembly tool for mounting within tubular cores tubular core tips of the type including a radially-inwardly extending flange at one axial end of a cylindrical wall, said tool comprising:
   a housing;
   an operating member movable relative to said housing;
   flange expansion means secured to said housing and responsive to said operating member for expanding said entrance flange outwardly into the cylindrical wall of said core; and,
   cutters secured to said housing and responsive to said operating member for shearing portions of the cylindrical wall of said core tip and forcing said portions outwardly into the cylindrical wall of said core,
   said flange expansion means defining a generally circular radially outwardly facing surface adapted for engaging said entrance flange and said surface being movable in response to movement of said operating member between a first position in which said surface is within a first coaxial cylindrical zone having a diameter no greater than the diameter of said wall of said core tip and a second position in which portions of said surface extend outside a second coaxial cylindrical zone having a diameter not less than the inner diameter of said wall of said core, and
   said cutters being movable in response to said movement of said operating member from a first position within said first zone to a second position in which portions of said cutters extend outside said second zone.

2. The assembly tool of claim 1 wherein said flange expansion means comprises an expansion head comprising a plurality of head segments mounted on an end of said housing for pivotal movement relative thereto.

3. The assembly tool of claim 2 wherein each of said head segments substantially comprises a sector of a circular plate pivoted for pivotal movement about an axis adjacent the circumferential surface of said each segment.

4. The assembly tool of claim 1 wherein said housing is substantially cylindrical and each of said cutters is pivotally secured to and mounted in a radially extending recess in said housing, and said flange expansion means comprises an expansion head comprising a plurality of head segments mounted on an end of said housing for pivotal movement relative thereto.

5. The assembly tool of claim 1 wherein said housing is substantially cylindrical, said flange expansion means is secured to one axial end of said housing, an outwardly extending flange adapted for engaging a reinforcing flange on the axial end of said tip opposite said entrance flange is secured to said housing at a point axially spaced from said flange expansion means, and said operating member extends axially through said housing, said tool including means for advancing said housing axially with said flange expansion means and said cutters in said first positions to insert said core tip axially into an end of said core until said reinforcing flange engages said core end and for moving said flange expansion means and said cutters into said second positions subsequent to the engagement of said reinforcing flange with said end.

6. The assembly tool of claim 5 wherein said flange expansion means comprises eight head segments.

7. The assembly tool of claim 2 wherein the portions of said outer circumferential surfaces of said segments adapted for engaging the axial end of said entrance flange extend beyond a coaxial cylindrical zone having a diameter equal to the inside diameter of said core when said flange expansion means are in said second position.

References Cited

UNITED STATES PATENTS 1,436,659 11/1922 Klocke _____ 72—393
2,142,017 12/1938 Riemenschneider et al. _ 72—393
3,289,287 12/1966 Guritz.

THOMAS H. EAGER, Primary Examiner

U.S. Cl. X.R.

29—234, 521, 523, 400; 72—393